United States Patent
Peter

(12) United States Patent (10) Patent No.: US 6,857,576 B2
Peter (45) Date of Patent: Feb. 22, 2005

(54) CONTROL METHOD OF AN ELECTRONIC THERMOSTAT VALVE

(75) Inventor: Werner Leu Peter, Kyunggi-Do (KR)

(73) Assignees: Hyundai Motor Company, Seoul (KR); Inzi Controls Co., Ltd., Kyunggi-Do (KR)

( * ) Notice: Subject to any disclaimer, the term of this patent is extended or adjusted under 35 U.S.C. 154(b) by 12 days.

(21) Appl. No.: 10/364,572

(22) Filed: Feb. 10, 2003

(65) Prior Publication Data

US 2003/0150924 A1 Aug. 14, 2003

(30) Foreign Application Priority Data

Feb. 9, 2002 (KR) ........................................... 2002-7691

(51) Int. Cl.[7] ................................................. F01P 7/02
(52) U.S. Cl. ..................... 236/34.5; 236/68 C; 123/41.1
(58) Field of Search .............................. 236/100, 99 K, 236/34.5, 75, 68 C; 123/41.1

(56) References Cited

U.S. PATENT DOCUMENTS 2,839,926 A * 6/1958 Woods et al.
3,500,634 A * 3/1970 Waseleski, Jr. et al. ... 236/68 C
6,505,580 B2 * 1/2003 Chamot et al. ............ 236/34.5

* cited by examiner

*Primary Examiner*—Harry B. Tanner
(74) *Attorney, Agent, or Firm*—Morgan Lewis & Bockius LLP

(57) ABSTRACT

The present invention relates to a method of controlling an electronic thermostat valve that is based on the driving conditions. The method includes using controlling parameters memorized in an ECU (Electronic Control Unit). A power source to activate the thermostat valve is originated from an expanding force of a thermal element and a change of stroke of an actuating means. A cooling system of a vehicle can be maintained in an optimized state such that fuel consumption and exhaust pollutants are reduced.

19 Claims, 5 Drawing Sheets

CONTROL METHOD OF AN ELECTRONIC THERMOSTAT VALVE

FIELD OF THE INVENTION

Generally, the present invention relates to a cooling system for an automobile. More particularly the present invention relates to a method for controlling an electronic thermostat valve of an automobile cooling system that maintains optimized cooling based on changing driving conditions.

DESCRIPTION OF THE RELATED ART

Typically, a thermostat valve is installed between the engine and radiator of an automobile. The thermostat functions to maintain the temperature of the automobile's engine by controlling a valve that increases or decreases the flow of the coolant in response to the coolant temperature. Conventionally, thermostats are mechanical type devices that operate on the expansion and contraction of a thermal expandable element. The thermal expandable element moves a piston vertically, thereby opening and closing a valve.

A drawback of the conventional thermostat valve is that there is a limit in the response time and accuracy in controlling the coolant temperature in response to changing driving conditions. This is because the opening and closing of the valve is dependent on the coolant temperature. The coolant temperature must increase prior to a responsive opening of the valve. Therefore, the increased cooling is in response to increased coolant temperature, not in response to the driving conditions. Furthermore, while cooling systems of automobiles are generally designed to satisfy the toughest driving condition, such as, a full load or high ambient temperature, for example, actual driving is generally conducted within about 70% of a full load. Accordingly, overcooling of the engine often occurs, which results in a decrease in engine efficiency, an increase in fuel consumption, and an increase in harmful exhaust particles.

In order to overcome these drawbacks, several attempts have been made to provide an adjustable electronic thermostat valve that optimizes the coolant temperature. One such electronic thermostat is an electronic thermostat valve having a heating means that cooperates with expansion of a wax element. The electronic thermostat valve comprises a plug for supplying electric power and a heater for heating the wax. The electric power supplied to the heater changes upon driving conditions such as speed of the automobile, temperature of the intake air, and load conditions. However, a drawback of this electronic thermostat is that the high temperature of the heating means easily damages the component parts of the valve. A further drawback is slow response time. Yet another drawback is that factors such as the load on the engine, rotation speed of the engine, and temperature of the engine are used as critical factors in controlling the thermostat valve. However, the coolant temperature is actually a more critical factor and it is not included. Accordingly, the conventional controlling method is inaccurate in controlling the temperature of the engine and changing the efficiency of cooling in accordance with variations in driving conditions.

SUMMARY OF THE INVENTION

The present invention provides a method for controlling an adjustable electronic thermostat valve. The electronic thermostat valve comprises an actuating means provided with a rod for stroking a chamber of an expandable thermal element. Therefore, the temperature at which the thermostat valve opens and closes is easily adjusted based on the driving conditions. As a result, the cooling efficiency of the engine is increased, the engine is maintained in an optimized state, while exhaust emissions and fuel consumption are reduced.

Furthermore, the present invention includes an actuating means capable of changing the volume of a chamber of the expendable thermal element. Therefore, temperature of the engine can be precisely and promptly controlled by operation of the valve in response to a control signal.

Still further, the present invention provides a control method for an adjustable electronic thermostat valve that considers the difference between the coolant temperature at the outlet of the engine and the coolant temperature at the outlet of a radiator as a controlling parameter. Furthermore, the method of the present invention includes a step to consider a sudden change in a control parameter of full load state on the engine, such as, sudden acceleration of the automobile, so the engine is maintained within a preferable temperature range even when a full load is applied to the engine.

It is preferred that the method of the present invention is provided with an actuating means that changes the volume of a chamber of the thermal element. The volume is changed in response to a control signal based on the coolant temperature in the engine. The change in volume allows the valve to be operated within a preferable temperature range.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Coolant temperature depends on the load applied to an engine, the temperature of the intake air, and the RPM of the engine. For example, when the load applied to the engine is increased, the coolant temperature is accordingly increased. Subsequently, the displacement of a thermostat valve is enlarged in order to increase the flow of the coolant for cooling down the engine. In addition, the temperature of intake air affects the specific gravity of the intake air. If the specific gravity of the intake air is reduced, the efficiency of the engine is decreased. Also, the coolant temperature at the outlet of the radiator is varied in proportion to the variation of ambient temperature. When the specific gravity of the intake air is reduced, a thermostat valve increases the flow of coolant in response to a control signal to increase the efficiency of the cooling system.

A control method of the present invention adopts the difference ($\Delta T_{avail} = T_{CEO} - T_{RO}$) between the coolant temperature at an outlet of a radiator ($T_{RO}$) and the coolant temperature at an outlet of an engine ($T_{CEO}$) as an operating parameter of the thermostat valve. Preferably, this difference may be a main operating parameter. The calculation is readily done by an ECU (Electronic Control Unit) equipped in a conventional automobile, and the result is saved into the ECU for later use.

In addition, the load status applied to an engine can be also used as a parameter to control the operation of a thermostat valve. However, when the load status is adopted as a parameter to control the thermostat valve, sudden acceleration, such as, climbing a hill, or sudden acceleration should be considered as an exception. The exceptional situations are determined by a step of checking whether the time derivative of the temperature at an outlet of a radiator is bigger than a threshold value.

Further, it is preferable to adopt the speed of the vehicle as a parameter to control the operation of the thermostat valve. This helps avoid damage to the engine and noise generated from the engine. While a vehicle is driving at high speed, coolant temperature at an outlet of the radiator is increased through the flow of heat. In this case, the difference between the temperature of coolant at the outlet of the engine and the temperature of coolant at an outlet of the radiator is used as a controlling parameter.

Hereinafter, embodiments of the present invention, which take the above-mentioned controlling parameters into consideration, are described with reference to the accompanying drawings.

Figure 1:
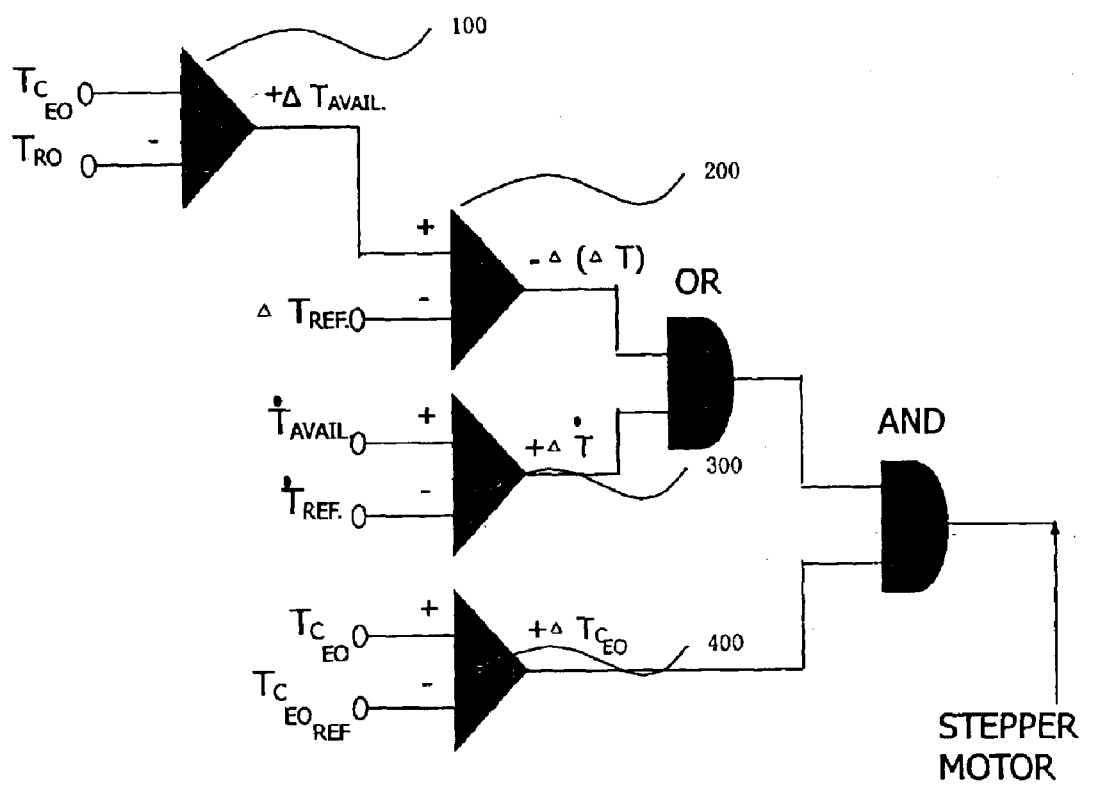
FIG. 1 is a diagrammatic depiction of a control logic according to an embodiment of the present invention.

FIG. 1 illustrates an embodiment of the control logic that develops a control signal for adjusting the displacement of a thermostat valve. A first calculator(comparator) 100 outputs a difference $\Delta T_{avail}$ between the coolant temperature at an outlet of the engine and the coolant temperature at an outlet of a radiator. Furthermore, a second calculator (comparator) 200 calculates the difference, $\Delta T_{ref}$, between the reference coolant temperature at an engine outlet and the reference coolant temperature at a radiator outlet ($\Delta T_{ref} = (T_{CEO} - T_{RO})_{reference\ value}$) for comparison with the $\Delta T_{avail}$. The limit temperature at the engine and radiator outlets refers to predetermined temperature values that are stored in the ECU. In use, the second calculator(comparator) 200 compares the temperature actually measured at the radiator and engine outlets to the limit temperature stored in the ECU. The second calculator(comparator) 200 then outputs an ON/OFF signal to the OR gate which is described below. Subsequently, the second calculator(comparator) 200 outputs difference of $\Delta T_{ref}$ and $\Delta T_{avail}$ based on the inputted $\Delta T_{ref}$ and $\Delta T_{avail}$. The second calculator(comparator) 200 outputs an ON/OFF signal to the OR gate after comparing $\Delta T_{avail}$ to $\Delta T_{ref}$. When $\Delta T_{avail}$ is smaller than $\Delta T_{ref}$ the second calculator(comparator) 200 outputs an ON signal to the OR gate. Otherwise, the second calculator(comparator) 200 outputs an OFF signal to the OR gate.

The third calculator(comparator) 300 calculates the difference between the time derivative of the coolant temperature, measured at an outlet of a radiator ($dT_{RO}/dt = \overset{*}{T}_{avail}$) and a reference time derivative of the coolant temperature at an outlet of a radiator ($\overset{*}{T}_{ref}$), and outputs $\Delta(\overset{*}{T})$. The reference time derivative of temperature refers to a predetermined value for the time derivative of coolant temperature at the outlet of a radiator. This predetermined value is then stored in the ECU for use in the third calculator(comparator) 300. The calculator(comparator) 300 then compares the time derivative of temperature actually measured to the reference time derivative of temperature and outputs and ON/OFF signal to the OR gate. When the time derivative of temperature actually measured is larger than the reference time derivative of temperature, the third calculator(comparator) 300 outputs an ON signal to the OR gate. Otherwise, the third calculator(comparator) 300 outputs an OFF signal to the OR gate. The third calculator (comparator) 300 thus takes into consideration the status of a vehicle and whether it is being operated in an overloaded state.

The control logic of the present invention is further provided with an OR gate that outputs the difference of $\Delta T_{ref}$ and $\Delta T_{avail}$ into an AND gate. Furthermore, the OR gate also considers the overloaded state of a vehicle by receiving $\Delta \overset{*}{T}$ as an input parameter along with the difference of $\Delta T_{ref}$ and $\Delta T_{avail}$. In particular, the OR gate outputs an ON/OFF signal depending on the ON/OFF inputs delivered to the OR gate from the second and third calculator(comparator)s, respectively. The table 1 below shows the output from the OR gate where the Input 1 corresponds to the output from the second calculator(comparator) 200 and the Input 2 corresponds to the output from the third calculator (comparator) 300.

| Input 1 | Input 2 | Output |
|---------|---------|--------|
| ON      | ON      | ON     |
| ON      | OFF     | ON     |
| OFF     | ON      | ON     |
| OFF     | OFF     | OFF    |

As shown in the table 1, the OR gate outputs an ON/OFF signal in accordance with the particular inputs received from the second and third calculator(comparator)s, respectively.

A fourth calculator(comparator) 400 calculates the difference ($\Delta T_{CEO}$) between the coolant temperature measured at an outlet of an engine ($T_{CEO}$) and the reference coolant temperature at an outlet of an engine ($T_{CEO-ref}$). The fourth calculator(comparator) 400 outputs an ON/OFF signal to the AND gate. The fourth calculator(comparator) 400 outputs an ON signal to the AND gate when the coolant temperature, measured at an outlet of the engine, is larger than the reference coolant temperature at an outlet of an engine. Otherwise, the fourth calculator(comparator) 400 outputs an OFF signal to the AND gate.

In addition, the control logic of the present invention includes an AND gate that calculates a basic condition for operating the thermostat and the difference of $\Delta T_{ref}$ and $\Delta T_{avail}$. In particular, the AND gate outputs an ON/OFF signal depending on the particular inputs received from the OR gate and the fourth calculator(comparator) 400. The table 2 below shows the logic of the AND gate and the output of the AND, where Input 1 is the output from the OR gate and Input 2 is the output from the fourth calculator (comparator) 400.

| Input 1 | Input 2 | Output |
|---------|---------|--------|
| ON | ON | ON |
| ON | OFF | OFF |
| OFF | ON | OFF |
| OFF | OFF | OFF |

As shown in the table 2, after the calculation, the AND gate outputs a controlling ON/OFF signal to the actuating means of the thermostat valve.

Figure 2:
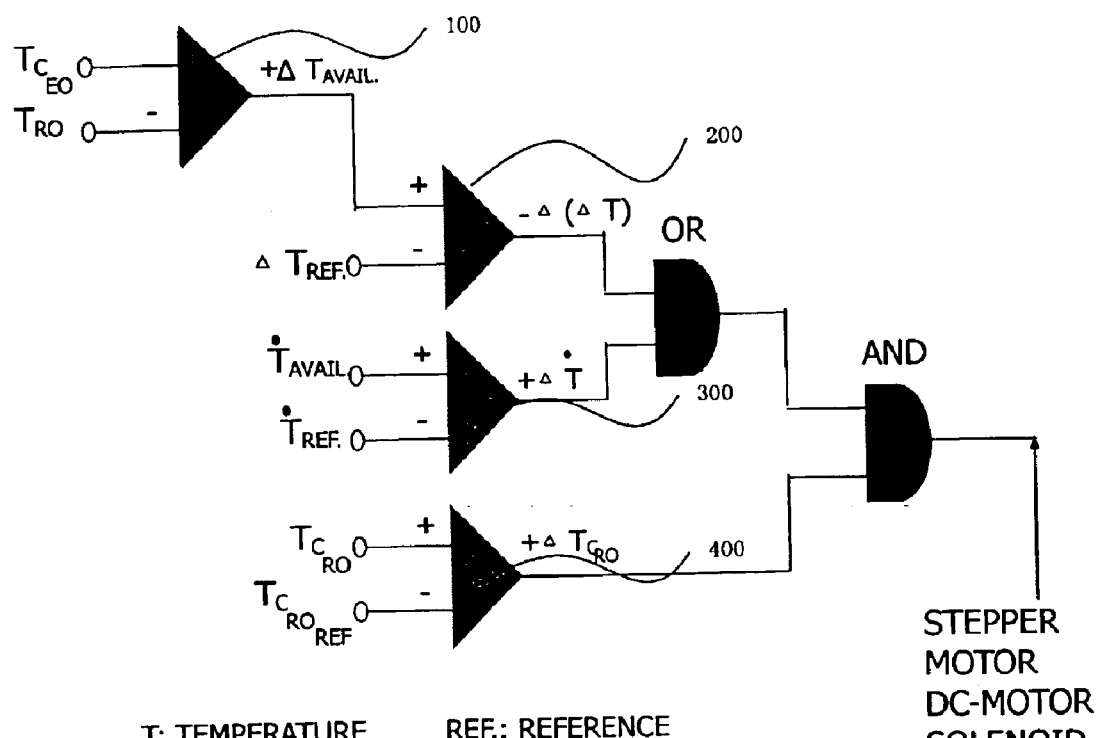
FIG. 2 is a diagrammatic depiction of another control logic according to an embodiment of the present invention.

FIG. 2 shows another embodiment of the present invention where the fourth calculator(comparator) 400 calculates the difference ($\Delta T_{RO}$) between the coolant temperature measured at an outlet of a radiator ($T_{RO}$) and the reference coolant temperature at an outlet of a radiator ($T_{RO-ref}$). These values are used to generate an ON/OFF output signal from the fourth calculator(comparator) to the AND gate. The AND gate then processes the same logic as above described in the table 2.

A thermostat valve according to the present invention is activated by the expanding force of a thermal element, and a change in the stroke of an actuating means to change the volume of the chamber enclosing the thermal element. The actuating means can be selected by a person skilled in the art from mechanisms such as a stepping motor, a DC motor, a linear solenoid, or the like, all of which have the capability of responding rapidly. By employing a stepping motor as an actuating means, for example, the volume of the chamber of the thermal element is precisely controlled, thereby precisely adjusting the displacement of the thermostat valve. Therefore, the flow of coolant to an engine is accurately controlled and the temperature of an engine is maintained in an optimized range.

Figure 3:
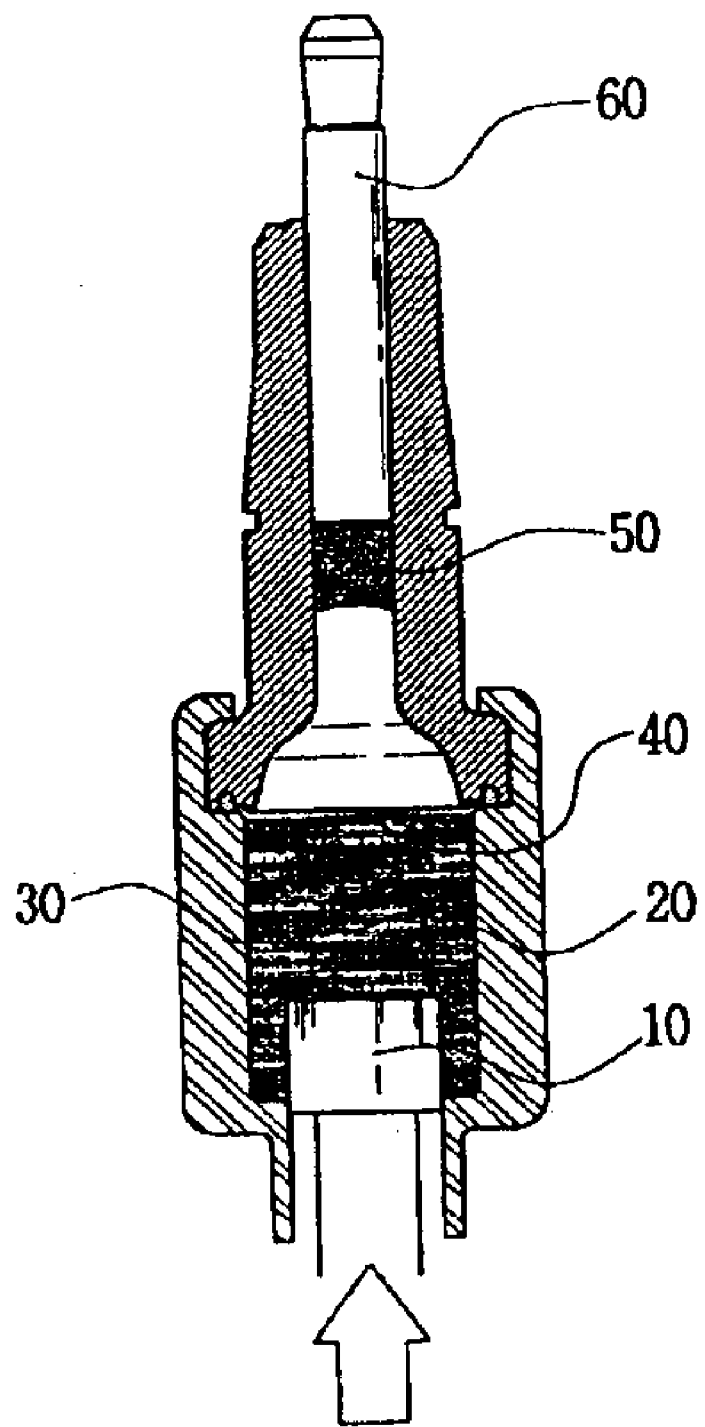
FIG. 3 and FIG. 4 are sectional views of an adjustable electronic thermostat valve according to the present invention.
Figure 4:
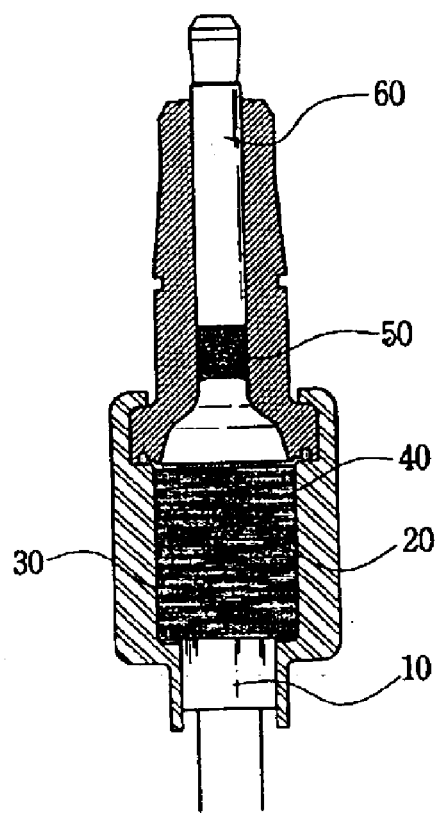
Figure 5:
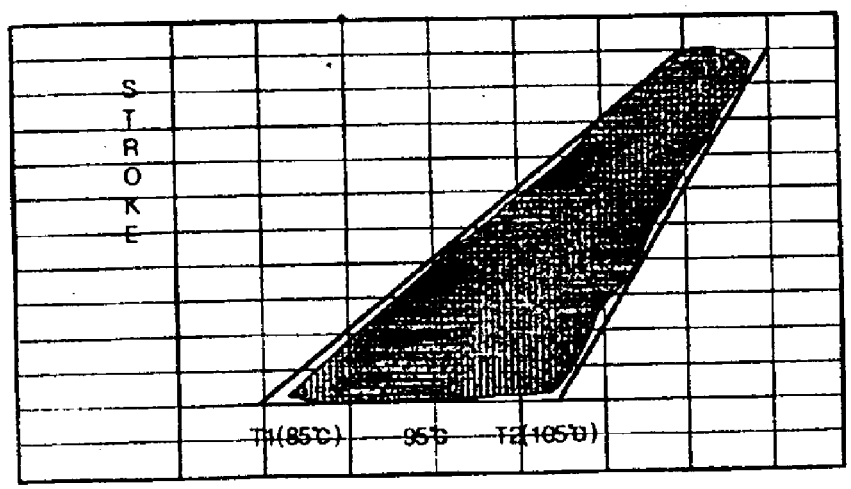
FIG. 5 is a graph showing the variation of an opening and closing temperature of an adjustable electronic thermostat valve of the present invention in accordance with change of the stroke of a rod.

FIGS. 3 and 4 show how the volume of the chamber 30 enclosing thermal element 20 can be changed without a variation of the volume of the thermal element by stroking a rod of the actuating means. For example, the volume of the chamber, enclosing the thermal element, can be changed by changing the position or depth of the rod 10 inserted into the chamber 30. Typically, a thermal element is, for example, a wax that undergoes a phase change from a solid to a liquid at a characteristic temperature. During phase change from a solid to a liquid, the volume of the thermal element increases. Therefore, enclosing a thermal element 20 within a chamber 30 will cause the pressure with the chamber 30 to be increased, allowing a valve of the chamber 30 to be opened. By mechanically reducing the volume of the chamber 30, by stroking the rod 10 into the chamber, the volume of thermal element 20 is decreased, thereby increasing the pressure on the thermal element 20 in the chamber 30. This increase in pressure on the thermal element 20 changes the characteristics at which the thermal element 20 undergoes phase change. Accordingly, the temperature at which the thermal element 20 undergoes phase change and subsequently operates a valve plate of a chamber 30 can be adjusted between about 85 degrees Celsius (C.) and 105 degrees C. in accordance with the movement of the rod 10.

Embodiments of a control method of the present invention can provide a preferable amount of coolant to an engine based on the driving conditions. By changing the temperature at which the valve plate opens between about 85 and 105 degrees C. in response to the control signal generated from the ECU (Electronic Control Unit). Where the control signal from the ECU is based on the input signals, such as, the load status applied to the engine, RPM of the engine, coolant temperature, and temperature of the intake air. For example, as shown in FIG. 3, when the thermostat valve is configured to a low-temperature mode, rod 10 of an actuating means is deeply inserted into a chamber 30 enclosing thermal element 20. Accordingly, the temperature at which the thermostat valve opens can be lowered to about 85 degrees C. As shown in FIG. 4, when the thermostat valve is configured to high-temperature mode, rod 10 of the actuating means is withdrawn from the chamber 30 enclosing the thermal element. Accordingly, at this setting, the temperature at which the thermostat valve opens can be raised to about 105 degrees C. because the thermal element must expand farther to cause actuation. In FIGS. 3 and 4, a diaphragm 40, liquid 50, and a piston 60 are disclosed that assist in moving the valve.

Figure 6:
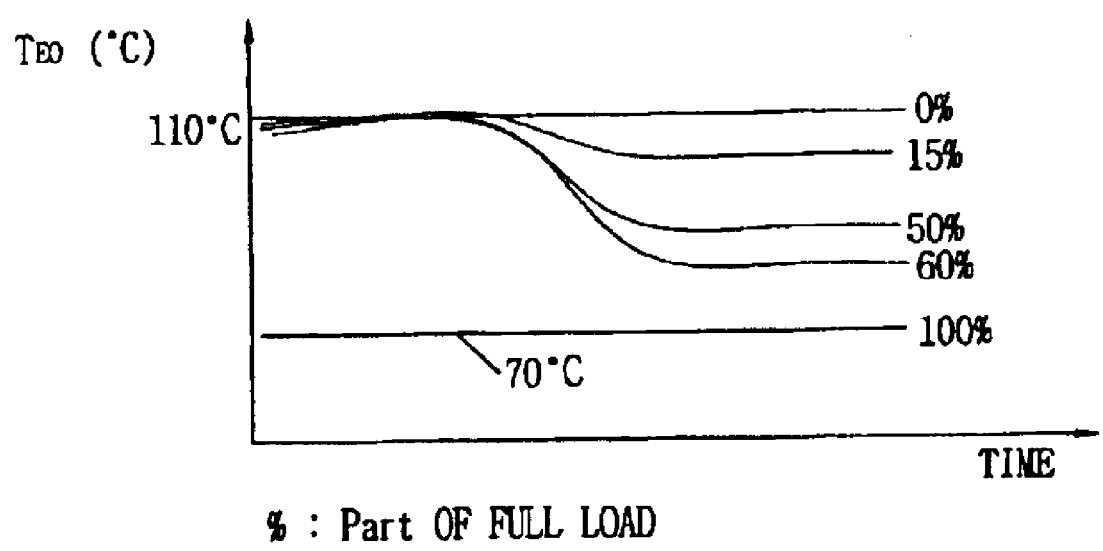
FIG. 6 is a graph showing the variation of the temperature of coolant at the outlet of an engine in accordance with change of load.

In an alternative embodiment, as shown in FIG. 6, by controlling the stroke of the rod, the preferable temperature at which to open the thermostat valve is based on driving conditions. Thereby, the flow of coolant is accurately controlled so that the cooling efficiency of the engine is maintained in an optimized state.

In FIGS. 3 and 4, the diameter of the rod 10 is larger than the diameter of the piston 60. Therefore, sufficient displacement of the piston 60 is achieved even with a small stroke of the rod 10. Consequently, a sufficient amount of coolant is supplied to maintain the engine in an optimal range of temperature. In alternative embodiments, changing the ratio of the diameter of the rod 10 to the diameter of the piston 60 can proportionally change the displacement of the piston 60.

Further, there is provided an elastic element for returning the rod 10 to a preferred position without the use of any electric power. A suitable elastic element would be a torsion spring or the like. Using a torsion spring, for example, the rod 10 is returned to an initial position (withdrawn position) when electric power is disconnected. Accordingly, the thermostat valve is configured to low-temperature mode and its operating depends on the expansion of the thermal element. Thus, overheating of the engine by the sucking of the rod 10 into the high-temperature mode is avoided.

A software component of the control logic according to an embodiment the present invention comprises three phases as described below.

1) Checking phase:
   after starting an engine, the state of the thermostat is verified in the order shown below.
   Checking resistance of an actuating means (stepping motor, DC motor, solenoid, or the like).
   Checking position of the motor.
   Checking electrical connection between elements.
   Changing a thermostat valve into high-temperature mode.
   Checking closing state of a thermostat valve.
   At this phase, the temperature of coolant at an outlet of an engine is below 100 degrees C. and the temperature of coolant at an outlet of a radiator is much lower than 40 degrees C.

2) Warming up phase:
   The thermostat valve is still closed (i.e. flow of coolant through an radiator is 0 l/min)
   At this phase, the temperature of coolant at an outlet of the engine is below 100 degrees C. and the temperature of coolant at an outlet of a radiator is much lower than 40 degrees C.

3) Warmed phase:
   Temperature of coolant at an outlet of the engine is higher than 100 degrees C. and the temperature of coolant at an outlet of a radiator is higher than 40 degrees C.

Unless the temperature of coolant at an outlet of a radiator reaches a threshold value, the thermostat valve will not move.

A. Partial load:
When the coolant temperature reaches the threshold value, the thermostat valve gradually opens. At this state, the thermostat valve is configured to a high-temperature mode.

B. Full load:
The thermostat valve is configured to low-temperature mode.
The thermostat valve is fully opened.
The actuating means (i.e. stepping motor) is operated by a control signal generated from the control logic.
Temperature of coolant at an outlet of a radiator is much higher than 40 degrees C.
A fan starts to rotate because the thermostat valve is configured to low-temperature mode.

C. Idling phase:
The thermostat valve is normally configured to a low-temperature mode.
Because the coolant temperature, at an outlet of a radiator, is higher than the threshold value, the thermostat valve is maintained in an open state and the fan is still running.
Until the coolant temperature, at an outlet of a radiator, becomes lower than the threshold value, the fan keeps on rotating even though an engine is stopped.

While this invention has been described in connection with what is presently considered to be the most practical and preferred embodiment, it is to be understood that the invention is not limited to the disclosed embodiments, but, is intended to cover various modifications and equivalent embodiments and arrangements included within the scope and spirit of the appended claims.

What is claimed is:

1. A method for controlling an electronic thermostat valve, comprising:
    control logic for changing a geometrical volume of a thermal element chamber wherein said control logic sends a controlling signal to an actuator means based on calculation of the optimal coolant temperature (component temperature)in a combustion engine, whereby the coolant temperature at which the thermostat valve opens an controls can be varied within a preferable temperature range;
    wherein said temperature differential calculation comprises calculating and outputting a difference ($\Delta T_{avail}$) between the temperature of coolant at an outlet of the engine ($T_{CEO}$) and the temperature of coolant at an outlet of the radiator ($T_{RO}$);
    presetting a reference value ($\Delta T_{ref}$) between reference temperature of coolant at the outlet of the engine and a reference temperature of coolant at the outlet of the radiator;
    calculating and outputting a difference of $\Delta T_{ref}$ and $\Delta T_{avail}$;
    outputting a first control signal by means of an OR gate based at least in part on said $\Delta T_{ref}$ and $\Delta T_{avail}$; and
    outputting a second controlling signal by means of an AND gate for selectively controlling said chamber volume based on said first control signal and a current coolant temperature.

2. The method of claim 1, wherein the OR gate further comprising:

receiving the difference $\Delta(\overset{*}{T})$ between a time derivative of the temperature of coolant measured at the outlet of the radiator ($dT_{RO}/dt = \overset{*}{T}_{avail}$) and a reference time derivative of the coolant temperature at the outlet of the radiator ($\overset{*}{T}_{ref}$) as an input value; and
outputting said first control signal based on said $\Delta(\overset{*}{T})_{avail}$ and said $\Delta T_{ref}$ and $\Delta T_{avail}$ difference.

3. The method of claim 1, wherein said second signal is further based on a difference ($\Delta T_{CEO}$) between the coolant temperature measured at an outlet of an engine ($T_{CEO}$) and the reference temperature of coolant at an outlet of an engine($T_{CEO-ref}$).

4. The method of claim 1 wherein said second signal is further based on a difference ($\Delta T_{RO}$) between the temperature of coolant measured at an outlet of an engine ($T_{RO}$) and the reference temperature of coolant at an outlet of an engine ($T_{RO-ref}$), which is calculated by the forth calculator (comparator).

5. The method of claim 1, wherein a temperature of coolant at which the thermostat valve opens and controls is varied in inverse proportion to a displacement in volume of the chamber.

6. The method according to claims 1 or 5, wherein the temperature at which the thermostat valve opens and controls, is changed between about 85 degrees C. and about 105 degrees C. based on driving conditions of the vehicle.

7. The method according to claims 1 or 5, wherein the volume of the chamber is changed by displacement of a rod adjusted by changing a ratio of a diameter of the rod to a diameter of a piston.

8. The method of claim 1, wherein an elastic element is provided for substantially returning the rod to an initial position in case of electric power failure such that the electronic thermostat valve can be automatically configured to a low-temperature level during an electric power failure.

9. A method for controlling an electronic thermostat valve in a vehicle with an engine and radiator, wherein said valve is actuated by a thermal element disposed within a chamber having a volume, said method comprising adjusting responsiveness of the thermal element by changing the volume of the chamber based on determination of a temperature differential across the engine and radiator.

10. The method of claim 9, wherein said temperature differential determination comprises:
    determining a first difference between the temperature of coolant at an outlet of the engine and the temperature of coolant at an outlet of the radiator;
    setting a reference value between a coolant limit temperature at the outlet of the engine and a coolant limit temperature at the outlet of the radiator;
    determining a second difference between said first difference and said reference value; and
    outputting a first control signal for selective control of said chamber volume based at least in part on said second difference.

11. The method of claim 10 wherein said temperature differential calculation further comprises:
    setting a coolant outlet reference temperature;
    determining a third difference between said coolant outlet reference temperature and an actual coolant outlet temperature; and
    outputting a second control signal for selectively controlling said chamber volume based on said first control signal and said third difference.

12. The method of claim 11, further comprising determining a fourth difference between a time derivative of the coolant temperature measured at the outlet of the radiator and a reference time derivative of the coolant temperature at the outlet of the radiator, wherein said first control signal is further based in part on said fourth difference.

13. The method of claim 11, wherein said coolant outlet temperature is an engine outlet temperature.

14. The method of claim 11, wherein said coolant outlet temperature is a radiator outlet temperature.

15. A method for controlling an electronic thermostat valve, comprising:

measuring coolant temperature of a vehicle;

calculating a difference between said measured coolant temperature and a predetermined coolant temperature; and actuating a volume change of a chamber housing a thermal element based on said calculated difference such that a temperature at which the thermal element undergoes a phase change is varied within a desired range.

16. The method of claim 15, wherein said measuring coolant temperature is measured at an outlet of an engine.

17. The method of claim 15, wherein said measuring coolant temperature is measured at an outlet of a radiator.

18. A method for controlling an electronic thermostat valve, comprising:

control logic for changing a geometrical volume of a thermal element chamber wherein said control logic sends a controlling signal to an actuator means based on calculation of the optimal coolant temperature (component temperature)in a combustion engine, whereby the coolant temperature at which the thermostat valve open and controls can be varied within a preferable temperature range and wherein a temperature of coolant at which the thermostat valve opens and controls is varied in inverse proportion to a displacement in volume of the chamber.

19. A method for controlling an electronic thermostat valve, comprising:

control logic for changing a geometrical volume of a thermal element chamber wherein said control logic sends a controlling signal to an actuator means based on calculation of the optimal coolant temperature (component temperature)in a combustion engine, whereby the coolant temperature at which the thermostat valve open and controls can be varied within a preferable temperature range and wherein the volume of the chamber is changed by displacement of a rod adjusted by changing a ratio of a diameter of the rod to a diameter of a piston.

* * * * *